No. 797,000. PATENTED AUG. 15, 1905.
J. R. HARRISON & F. C. STUCKEL.
BAND CUTTER AND FEEDER FOR THRESHING MACHINES.
APPLICATION FILED MAY 6, 1901.
3 SHEETS—SHEET 1.
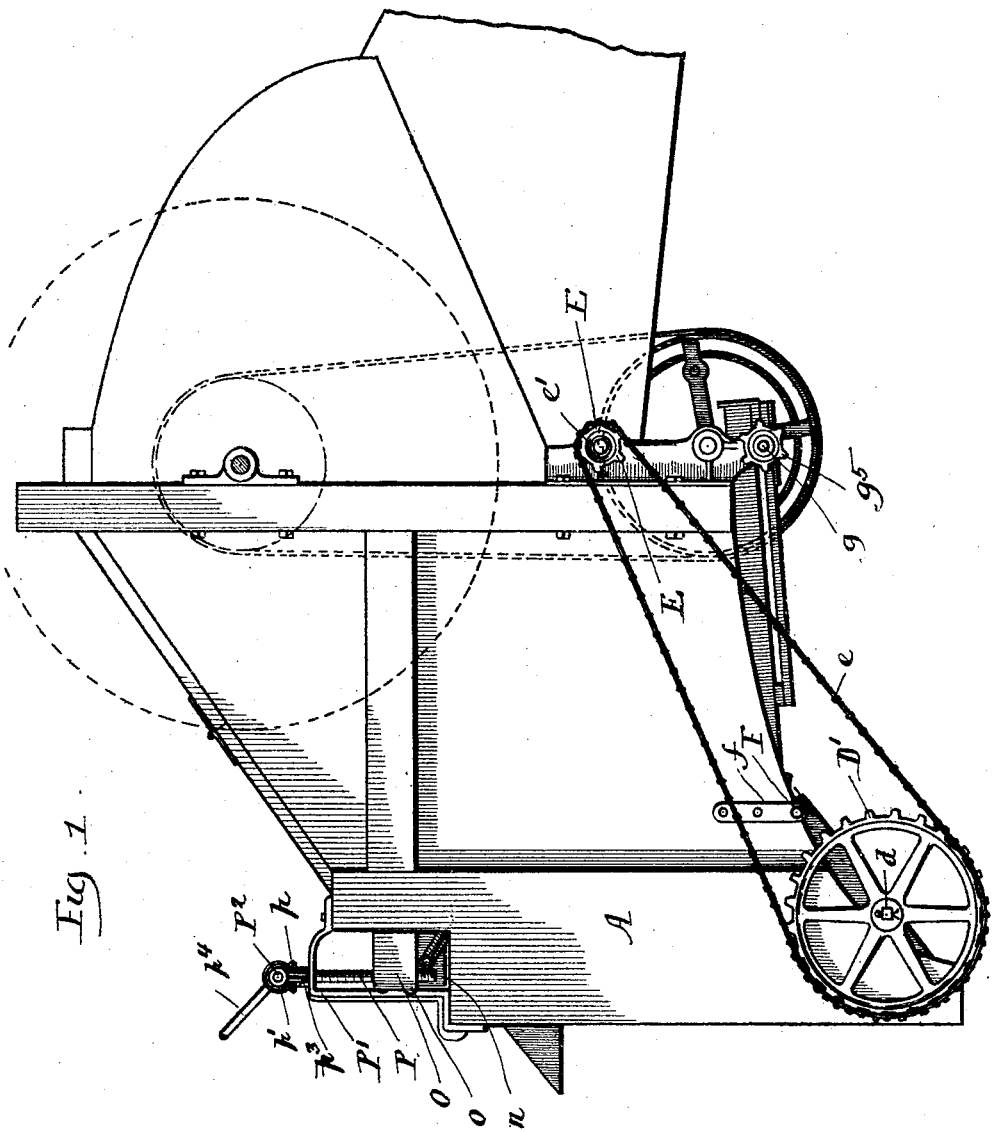

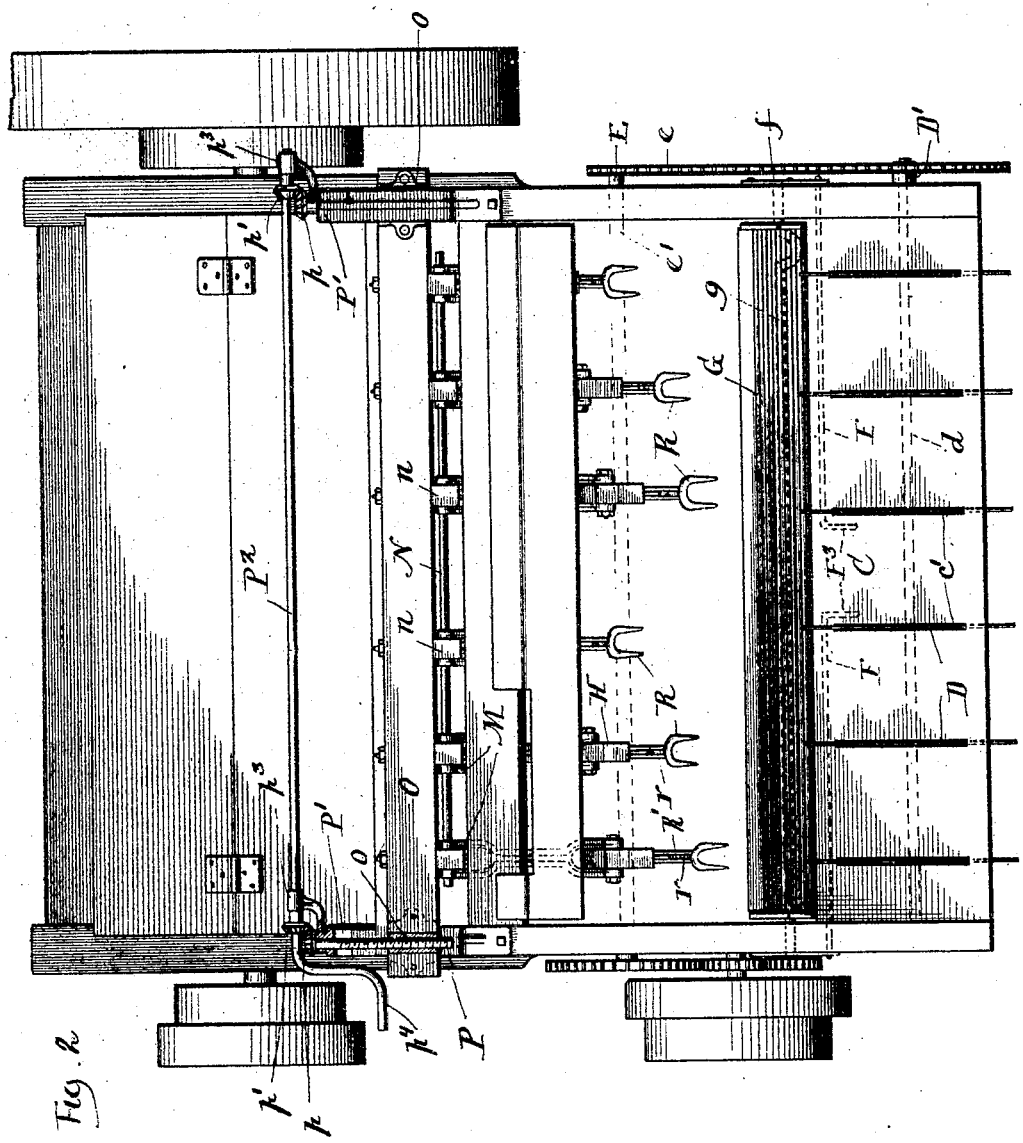

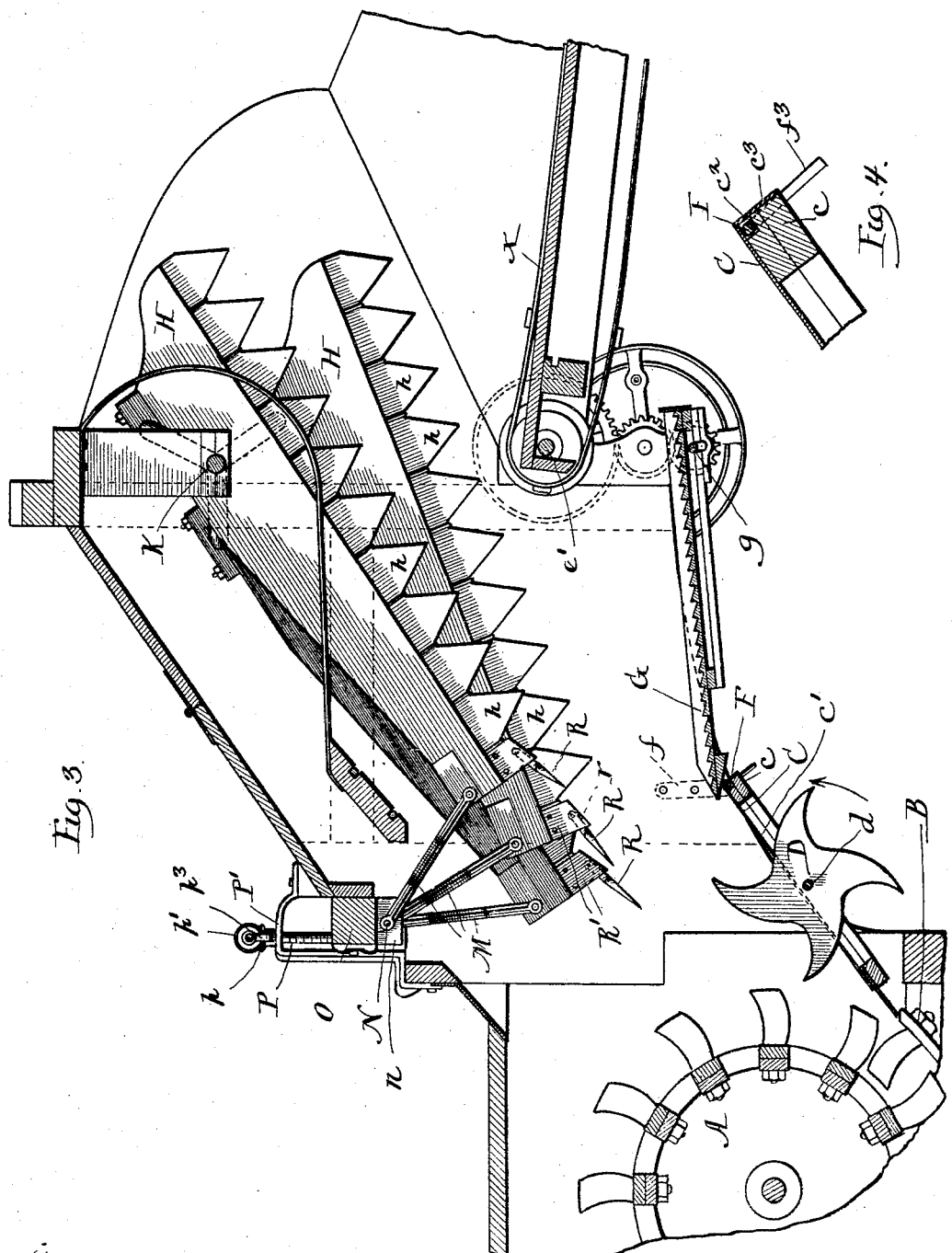

UNITED STATES PATENT OFFICE.

JAMES R. HARRISON AND FRANK C. STUCKEL, OF RACINE, WISCONSIN, ASSIGNORS TO J. I. CASE THRESHING MACHINE COMPANY, OF RACINE, WISCONSIN, A CORPORATION.

BAND-CUTTER AND FEEDER FOR THRESHING-MACHINES.

No. 797,000.          Specification of Letters Patent.          Patented Aug. 15, 1905.

Application filed May 6, 1901. Serial No. 58,997.

*To all whom it may concern:*

Be it known that we, JAMES R. HARRISON and FRANK C. STUCKEL, residents of the city and county of Racine, State of Wisconsin, have invented certain new and useful Improvements in Band-Cutters and Feeders for Threshing-Machines, of which the following is a full, clear, and exact description.

This invention has for its object more particularly to provide an improved band-cutter and feeder mechanism for threshing-machines; and the invention consists in the novel features of construction hereinafter described, illustrated in the accompanying drawings, and particularly pointed out in the claims at the end of this specification.

Figure 1 is a view in side elevation of a portion of a threshing-machine embodying our invention, the parts shown being located immediately in front of the threshing-cylinder. Fig. 2 is a rear elevation looking forward from the threshing-cylinder, certain parts being shown in vertical section. Fig. 3 is a view in vertical longitudinal section through the mechanism shown in Figs. 1 and 2, a section of the threshing-cylinder being also illustrated. Fig. 4 is an enlarged detail view showing the manner of detachably connecting the stationary portion of the hopper-bottom in front of the threshing-cylinder.

The cylinder A and its concave B are of any usual or suitable construction. At the front of the concave B is mounted the supplemental hopper-bottom C, consisting, preferably, of a sheet-metal plate backed by a frame $c$, that affords bearings for the shaft $d$, on which are journaled the retarder-disks D. Each of these retarder-disks comprises a number of arms, preferably shaped as shown and adapted to extend through openings $c'$, formed in the supplemental hopper-bottom C, and the outer end of the shaft $d$ carries a sprocket-wheel D', to which revolution is transmitted by a chain $e$ from a sprocket-wheel E upon the shaft $e'$, by which shaft the endless carrier X is driven. The purpose of the retarder-disks D is to hold back the bottom of the bundles of grain, so as to more effectively allow the feeding and cutting arms to advance the top of the bundle into the cylinder first, thus insuring the cutting of all the bands and effecting a steady and even feed of straw to the cylinder at all times, thereby keeping the cylinder full and assuring a steady motion. By reference to Fig. 1 it will be seen that the sprocket-wheel D' at the end of the retarder-disk shaft $d$ is considerably larger than the wheel E on the shaft $e'$, the result being that the retarder-disks are driven at a comparatively slow rate of speed in the direction of travel of the grain. If it is desired to increase somewhat the speed of the retarder-disks, (this depending upon the character of the grain,) the sprocket-wheel E may be shifted from the sprocket-wheel $e'$ to a sprocket-wheel $g^5$ on the end of the crank-shaft $g$, (see Fig. 1,) this crank-shaft having a higher speed of revolution than the shaft $e'$.

The supplemental hopper-bottom C is removable for the purpose of permitting ready access to the concave B and threshing-cylinder A, and to enable this removal of the hopper-bottom to be conveniently effected we prefer to sustain the upper end of the hopper-bottom in the following manner, although manifestly other means may be employed for this purpose: The upper edge of the frame $c$ of the hopper-bottom is formed with a recess $c^2$, over which extends the flanged edge $c^3$ of the plate or bottom C. Through this recess extend the bolts F, the outer ends of which project through and are supported by dependent brackets $f$ at each side of the main frame. The rods F are formed with the inner angularly-bent ends $F^3$, that constitute handles for the rods, these handles extending through a cut-away portion of the frame $c$, and by drawing the handles $f^3$ toward each other the operator can withdraw the outer ends of the rods from their engagement with the brackets $f$, and thereby permit the supplemental hopper-bottom to be readily removed, together with the retarder wheels and shaft, whenever access is to be had to the thresher-cylinder and concave.

The sprocket-wheel D' at the outer end of the shaft $d$ is preferably connected to the squared end of the shaft by a cotter-pin, so that the sprocket-wheel may be readily withdrawn from the shaft when the supplemental hopper-bottom is to be removed. Upon the upper edge of the supplemental hopper-bottom C rests the inner end of the movable hopper-bottom or table G, the forward end of which is supported by the crank-shaft $g$, whereby a vibratory and reciprocating motion is imparted to the hopper-bottom in order to advance the grain as it is delivered from the endless carrier X. By reference to Fig. 3 it will be seen that the movable hopper-bottom G is but slightly inclined from the horizontal, while the supplemental hopper-bottom C is at a much steeper inclination. By this arrangement the bundles of grain as they are conveyed to the hopper-bottom G, and particularly as they are held back by the retarder wheels or arms D, are subjected to the action of the knives, which cut the bands and spread the grain to the full width of the cylinder over the hopper-bottom G; but as soon as the grain thus loosened up passes off of the retarder wheels or arms D it drops abruptly into the path of the knives of the threshing-cylinder at approximately the same angle as the concave or at a much greater angle than that at which it could be delivered directly from the movable hopper-bottom G. The effect of thus delivering the grain to the cylinder is to effectively loosen up and prevent the "slugging" of the grain, a feature especially advantageous if the grain is at all wet.

Above the hopper-bottom G extend the cutter-bars H, that carry the usual sickle-knife sections $h$. The upper ends of the cutter-bars H are hung upon the cranks of a compound crank-shaft K, by which motion is imparted to the cutter-bars. The lower end of each of the cutter-bars H is conveniently connected to the yoke-shaped end of a hanger M, and the upper end of each of these hangers is also preferably yoke-shaped, as shown, and is pivotally mounted upon a transverse rod N, that is sustained by suitable bearings $n$, bolted to the under side of the adjuster-bar O. This adjuster-bar O is provided adjacent its ends with screw-threaded thimbles $o$, through which pass the threaded rods P. The upper ends of the rods P are journaled in bearings P' and are provided with beveled gear-wheels P, that mesh with corresponding gear-wheels $p'$ on the transverse rod or shaft $P^2$. This rod or shaft $P^2$ is journaled in bracket-arms $p^3$, extending upward from the brackets or housings $P'$, and the outer end of the rod $P^2$ is provided with a handle $p^4$, whereby it may be conveniently turned. By this means the cross-support O can be readily raised or lowered while the machine is in operation to allow the cutter-knives to be set at any position to suit the size of bundles and the condition of the grain.

Each of the cutter-bars H is shown as provided at its rear end with a feed-fork R. Preferably each of these feed-forks has its shank $r$ pivoted between an inverted-U-shaped plate R', that is bolted to the inner end of each cutter-bar. The shanks of the forks R normally rest upon the U-shaped plates; but the forks are free to move in upward direction when the cutter-bars are moving toward the front. The purpose of these forks is to facilitate the loosening and opening out of the bundles and the advance of the grain into the machine.

It is manifest that the precise details of construction above set forth may be varied without departure from the scope of the invention.

Having thus described our invention, what we claim as new, and desire to secure by Letters Patent, is—

1. In a threshing-machine, the combination with the cylinder and concave, of a hopper having a movable feed-bottom slightly inclined downwardly and rearwardly toward said cylinder and concave, a steeply-inclined stationary supplemental bottom located between and independent of said movable bottom and said concave, said stationary supplemental bottom extending downwardly from the inner end of and at an angle to said movable bottom and being arranged substantially tangent to the outer end of said concave, a cross-shaft carried on said stationary supplemental bottom, retarding-fingers mounted upon said shaft and means for slowly rotating said shaft and fingers in the direction of the travel of the grain.

2. In a threshing-machine, the combination with the cylinder and concave, of a hopper having a movable feed-bottom slightly inclined downwardly and rearwardly toward said cylinder and concave, a steeply-inclined stationary supplemental bottom located between and independent of said movable bottom and said concave, said stationary supplemental bottom extending downwardly from the inner end of and at an angle to said movable bottom and being arranged substantially tangent to the outer end of said concave, a cross-shaft carried on said stationary supplemental bottom, retarding-fingers mounted upon said shaft, means for slowly rotating said shaft and fingers in the direction of the travel of the grain, supports at the side of the machine for said stationary supplemental bottom and means whereby said bottom is detachably connected to said supports.

3. In a threshing-machine, the combination with the cylinder and concave, of a hopper having a movable bottom and having a stationary supplemental bottom arranged intermediate the inner end of said movable bottom and the outer end of said concave, said supplemental bottom being inclined downwardly at an angle from the end of said movable bottom and substantially tangent with said concave, a cross-shaft below said stationary bottom retarding-fingers mounted on said cross-shaft and extending through said bottom, means for slowly driving said shaft and said retarding-fingers in the direction of travel of the grain, rearwardly-inclined cutter-bars arranged above said movable and stationary bottoms, means for reciprocating and vibrating said cutter-bars and feed-fingers mounted upon the rear lower ends of said cutter-bars, said feed-fingers being arranged above said retarding-fingers.

JAMES R. HARRISON.
FRANK C. STUCKEL.

Witnesses:
WYNN WINFIELD SCOTT,
EDWIN E. RUSSELL.